Figure 1:
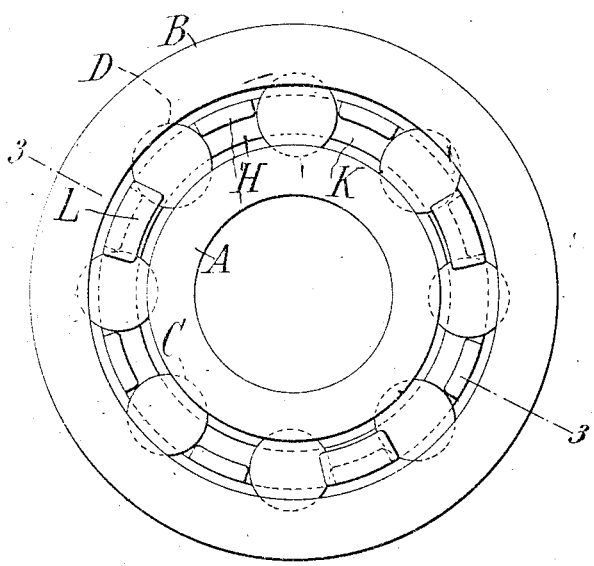

No. 838,303. PATENTED DEC. 11, 1906.
R. CONRAD.
METHOD OF MANUFACTURING AND ASSEMBLING BALL BEARINGS.
APPLICATION FILED MAY 18, 1906.

WITNESSES:
Fred White
René Ruine

INVENTOR:
Robert Conrad,
By Attorneys,
Arthur C. Fraser & Usina

UNITED STATES PATENT OFFICE.

ROBERT CONRAD, OF BERLIN, GERMANY.

METHOD OF MANUFACTURING AND ASSEMBLING BALL-BEARINGS.

No. 838,303.    Specification of Letters Patent.    Patented Dec. 11, 1906.

Original application filed February 23, 1904, Serial No. 194,894. Divided and this application filed May 19, 1906. Serial No. 317,468.

*To all whom it may concern:*

Be it known that I, ROBERT CONRAD, a subject of the German Emperor, residing at Berlin, Germany, have invented certain new and useful Improvements in the Method of Manufacturing and Assembling Ball-Bearings, of which the following is a specification.

This application is a division of my previous application, Serial No. 194,894, filed February 23, 1904. In that application there is described and claimed a bearing comprising a pair of rings and the balls between them, all arranged in a unitary structure, with the parts holding each other together, the rings having opposing grooves whose sides are uninterrupted throughout their circumference. I have discovered also a process by which such a bearing with uninterrupted sides may be manufactured and assembled very easily and rapidly, and such process forms the subject-matter of the present application. For this purpose the sides of the two rings are so proportioned as to be separated by a distance less than the diameter of the balls when the rings are concentric, so that in such position the balls cannot fall out nor the rings be separated from each other in an axial direction. The introduction of the balls into the raceway formed by the grooves is effected by shifting the rings eccentrically to each other to widen the space between the edges of the rings sufficiently to introduce the balls between the edges of the rings. A limited number of balls may be introduced in such a space, the balls extending when in contact with each other only partly around the raceway. The rings are then restored to a concentric position, and in order to prevent a return to the eccentric position spacers are introduced between the balls to distribute them substantially entirely around the raceway. By using elastic spacers I make them of such size as to substantially or approximately fill the raceway, so that they may not fall out at the sides, and I introduce them between the edges of the rings by sufficiently compressing them. By this process it will be seen the balls and spacers fill the entire circumference of the raceway and cannot escape therefrom accidentally, but can only be removed by a reversal of the process of assembling.

The accompanying drawings illustrate the application of the process to the specific style of bearing shown in the prior application above referred to. The drawings are more or less diagrammatic, and it will be understood that the term "balls" includes any equivalent rolling device and that various modifications may be made in detail and in the arrangement and combination of the parts without departing from the invention.

Figure 3:
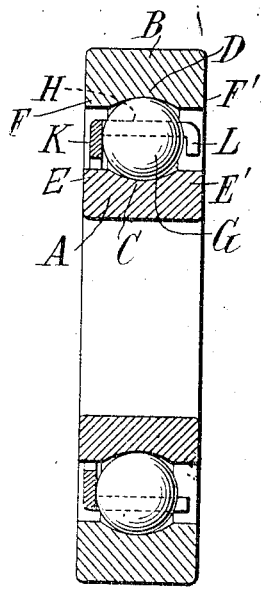
Figure 2:
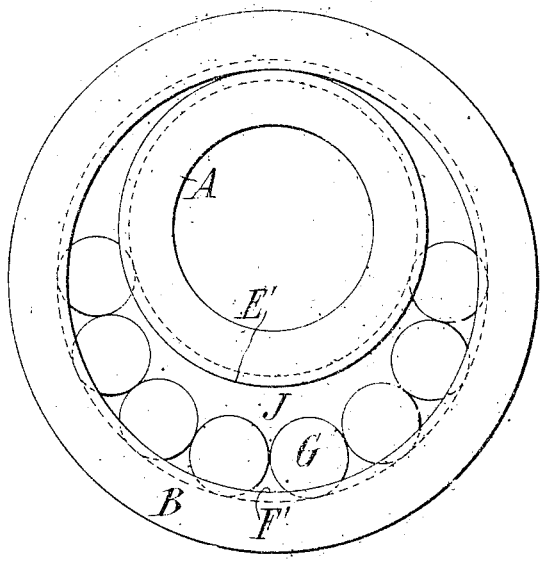
Figure 4:
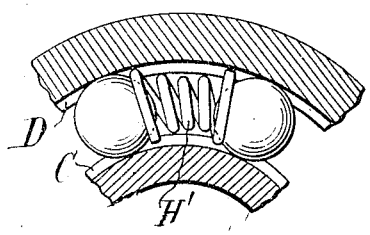

Figure 1 is a face view of a complete assembled bearing. Fig. 2 is a similar view showing the spacers withdrawn and the rings arranged in position for the introduction of the balls. Fig. 3 is a diametral section of Fig. 1 on the line 3 3. Fig. 4 is a detail section in a plane transverse to the axis of the rings and showing a different type of spacer.

Referring to the bearings illustrated, the inner and outer rings A and B, respectively, are formed with opposing preferably shallow grooves C and D, the sides or edges E E' and F F' of said grooves being separated by a distance less than the diameter of the balls G, so that the balls cannot escape from the grooves nor can the rings be shifted in an axial direction relatively to each other to any substantial extent. The balls are spaced apart from each other and are distributed around the raceway formed by the grooves C and D by means of spacers H, Figs. 1 and 3, or H', Fig. 4. Such a bearing, with uninterrupted sides or edges, has many practical advantages over previous bearings, the sides of which were either bodily removable or provided with a recess through which the balls might be introduced one at a time. To assemble such a bearing, I make the space between the edges E and F or between the edges E' and F' as great as possible, and then I shift the rings A and B to the eccentric position shown in Fig. 2, leaving a crescent-shaped space J between a pair of edges—such, for example, as E' F'—which is wider than the diameter of the balls G, and I then introduce as many of the balls G as possible in the manner shown. The number of balls which may be introduced is limited, but may be increased by distortion of the rings by means of mechanical tools or in any suitable manner.

When the balls are introduced, the rings are returned to the concentric position of Fig. 1, and in order to prevent their accidental return to the eccentric position the balls are distributed at substantially equal intervals around the raceway by introducing the spacers. The spacers may be of the type shown at H, all of which are united by means of a ring K, so as to form practically a cage adapted readily for insertion from the side. Preferably, however, they are of the compressible type shown at H' in Fig. 4. The spacers H are only held in place by the engagement of a flange L or a similar device with the balls. The spacers H', however, are held in place by reason of their size, being larger than the space between the sides of the grooves C and D. In order to introduce them, the springs are compressed and the individual spacers turned sidewise and introduced one by one through the space between the sides of the rings.

What I claim is—

1. The method of manufacturing and assembling a ball-bearing into a unitary structure the parts of which hold each other together, which consists in forming inner and outer rings having opposing grooves the sides of which are uninterrupted throughout their circumference, and which are separated by a distance less than the diameter of the balls when the rings are concentric, placing said rings eccentrically to each other to widen the space between said edges at one side to a width greater than the diameter of the balls, introducing through said space a limited number of balls extending when in contact with each other only partly around the raceway formed by said grooves, and restoring the rings to concentric position and introducing spacers between the balls to distribute them substantially entirely around the raceway so as to prevent the rings from returning to the eccentric position.

2. The method of manufacturing and assembling a ball-bearing into a unitary structure the parts of which hold each other together, which consists in forming inner and outer rings having opposing grooves the sides of which are uninterrupted throughout their circumference, and which are separated by a distance less than the diameter of the balls when the rings are concentric, placing said rings eccentrically to each other to widen the space between said edges at one side to a width greater than the diameter of the balls and enlarging said space by elastically deforming at least one of the rings, introducing through said space a limited number of balls, and restoring the rings to concentric position and introducing spacers between the balls to distribute them substantially entirely around the raceway so as to prevent the rings from returning to the eccentric position.

3. The method of manufacturing and assembling a ball-bearing into a unitary structure the parts of which hold each other together, which consists in forming inner and outer rings having opposing grooves the sides of which are uninterrupted throughout their circumference, and which are separated by a distance less than the diameter of the balls when the rings are concentric, placing said rings eccentrically to each other to widen the space between said edges at one side to a width greater than the diameter of the balls, introducing through said space a limited number of balls extending when in contact with each other only partly around the raceway formed by said grooves, and restoring the rings to concentric position and distributing the balls substantially entirely around the raceway by compressing and introducing between them elastic spacers adapted when compressed to pass between the edges of the rings, and when released to substantially or approximately fill the raceway so as to be held in by the sides of the groove.

In witness whereof I have hereunto signed my name in the presence of two subscribing witnesses.

ROBERT CONRAD.

Witnesses:
 WOLDEMAR HAUPT,
 HENRY HASPER.